(12) United States Patent
Gao et al.

(10) Patent No.: US 11,982,573 B2
(45) Date of Patent: May 14, 2024

(54) WATER ENVIRONMENT TEMPERATURE MEASUREMENT TOOL

(71) Applicants: Hohai University, Nanjing (CN); Jiangsu Yuzhi River Basin Management Technology Research Institute Co. Ltd., Nanjing (CN)

(72) Inventors: Haoyue Gao, Nanjing (CN); Qinghua Luan, Nanjing (CN); Wenqiang Wang, Nanjing (CN); Pengcheng Gu, Nanjing (CN); Jiajun Chen, Nanjing (CN); Lei Sun, Nanjing (CN); Cheng Gao, Nanjing (CN); Ziyuan Wang, Nanjing (CN); Hong Zhou, Nanjing (CN)

(73) Assignees: HOHAI UNIVERSITY, Nanjing (CN); JIANGSU YUZHI RIVER BASIN MANAGEMENT TECHNOLOGY RESEARCH INSTITUTE CO. LTD, Nanjing (CN)

( * ) Notice: Subject to any disclaimer, the term of this patent is extended or adjusted under 35 U.S.C. 154(b) by 0 days.

(21) Appl. No.: 18/353,675

(22) Filed: Jul. 17, 2023

(65) Prior Publication Data

US 2024/0094068 A1    Mar. 21, 2024

(30) Foreign Application Priority Data

Sep. 19, 2022  (CN) .......................... 202211138411.8

(51) Int. Cl.
*G01K 13/02*    (2021.01)
*G01K 1/08*     (2021.01)

(52) U.S. Cl.
CPC ............ *G01K 13/026* (2021.01); *G01K 1/08* (2013.01)

(58) Field of Classification Search
CPC .............................. G01K 13/026; G01K 1/08
See application file for complete search history.

(56) References Cited

U.S. PATENT DOCUMENTS

| | | | | |
|---|---|---|---|---|
| 3,961,531 | A | * | 6/1976 | Peng ..................... G01K 1/14 374/208 |
| 4,202,034 | A | * | 5/1980 | Bowditch ................. G01P 5/00 702/2 |

(Continued)

*Primary Examiner* — Nathaniel T Woodward
*Assistant Examiner* — Philip L Cotey
(74) *Attorney, Agent, or Firm* — MUNCY, GEISSLER, OLDS & LOWE, P.C.

(57) ABSTRACT

A water environment temperature measurement tool includes measurement boxes and a counterweight box; a plurality of groups of the measurement boxes are provided; the counterweight box is movably connected with a group of measurement boxes; and each measurement box is provided with a temperature measurement instrument inside. The water environment temperature measurement tool further comprises: control mechanisms, each comprising a water inlet pipe, a water retaining member, an elastic member, a control assembly, a rotating seat, a rotating shaft, a second screw rod, a control seat and a rotary assembly. In the water environment temperature measurement tool of the present invention, the control mechanisms can achieve extraction and temperature measurement of water at different water body depths by cooperating with the measurement boxes and the temperature measurement instruments.

7 Claims, 5 Drawing Sheets

(56) References Cited

U.S. PATENT DOCUMENTS

| | | | | |
|---|---|---|---|---|
| 4,410,282 | A * | 10/1983 | Leger | G01C 13/00 374/E1.021 |
| 5,072,540 | A * | 12/1991 | Monzyk | G01K 1/16 374/E1.021 |
| 5,152,610 | A * | 10/1992 | Hallett | E04H 4/14 374/208 |
| 5,169,236 | A * | 12/1992 | Iest | G01K 13/00 374/E1.008 |
| 5,947,051 | A * | 9/1999 | Geiger | E21B 41/04 114/313 |
| 8,763,455 | B1 * | 7/2014 | Chang | G01K 7/206 73/304 R |
| 2018/0173250 | A1 * | 6/2018 | Cimberio | G01F 1/50 |
| 2018/0321385 | A1 * | 11/2018 | Embry | G01V 8/10 |
| 2019/0365148 | A1 * | 12/2019 | Gabriel | F24C 7/006 |
| 2020/0141816 | A1 * | 5/2020 | Sanger | G01C 9/02 |
| 2022/0090970 | A1 * | 3/2022 | Guo | G01K 1/024 |
| 2022/0194829 | A1 * | 6/2022 | Perrier | C12M 41/42 |
| 2022/0229038 | A1 * | 7/2022 | McKelvey | E03B 7/078 |

\* cited by examiner

WATER ENVIRONMENT TEMPERATURE MEASUREMENT TOOL

TECHNICAL FIELD

The present invention belongs to the technical field of water environment monitoring, and particularly relates to a water environment temperature measurement tool.

BACKGROUND

After a water environment is polluted by heat, first victims are aquatic organisms. An upper limit of temperature for ordinary aquatic organisms to survive normally is 33-35° C. A rise in the water temperature reduces dissolved oxygen in water, and a water body is in an oxygen-deficient state. As a result, most aquatic organisms and fish populations transform or die, anaerobic bacteria may also reproduce a lot to aggravate corruption of organic matters, thereby affecting environment and ecological balance. In addition, the rise in temperature of river water provides an artificial breeding ground for some pathogenic microorganisms, allowing them to breed and overflow, which causes disease epidemics and endangers human health. Therefore, the water temperature affects agriculture, fishery, aquaculture and an aquatic ecological environment, and may further indirectly affects the human health. For this, it is necessary to arrange a water environment temperature measurement tool for measuring the temperature of the water body.

Most of existing water environment temperature measurement tools use a temperature detector. and the water in the water environment is extracted into a container by other auxiliary devices, and then detected through the temperature detector, so as to measure the temperature of the water environment. However, due to different depths of the water bodies in the water environment, the temperatures of the water bodies are also different. The existing devices cannot accurately extract the water at different depths; and the temperatures of the extracted water bodies may be affected by an external ambient temperature before the extracted water is detected by the temperature detector, thereby resulting in inaccurate measurement data about the temperatures of the water bodies.

Therefore, aiming to the above status quo, there is an urgent need for developing a water environment temperature measurement tool, so as to overcome the deficiencies in current practical application.

SUMMARY

Aiming to the deficiencies in the prior art, a purpose of the embodiments of the present invention is to provide a water environment temperature measurement tool, so as to solve the problems in the background.

To achieve the above purpose, the present invention provides the following technical solution:

A water environment temperature measurement tool includes measurement boxes and a counterweight box, where a plurality of groups of measurement boxes are provided, and are movably connected with each other; and the counterweight box is movably connected with a group of measurement boxes; one end of the counterweight box is arranged in an arc shape; the arc-shaped end of the counterweight box is provided with an opening; a counterweight block is fixedly arranged on an inner wall of the counterweight box; each measurement box is provided with a temperature measurement instrument inside; and a switching valve is arranged at a bottom of the measurement box. The water environment temperature measurement tool further includes:

a pushing mechanism, arranged in the counterweight box;

connection mechanisms, mounted on outer walls of the measurement boxes and the counterweight box separately, and configured to connect one measurement box with another measurement box and to connect the measurement boxes with the counterweight box; and control mechanisms, each including a water inlet pipe, a water retaining member, an elastic member, a control assembly, a rotating seat, a rotating shaft, a second screw rod, a control seat and a rotary assembly, wherein one end of the water inlet pipe extend out of the measurement box, the other end of the water inlet pipes is fixedly arranged in the measurement box, the water retaining member and the elastic member are movably arranged in the water inlet pipe, one end of the elastic member is connected with the water retaining member, and own elastic force of the elastic members arranged on different measurement boxes are different.

each control assembly comprises a buoyancy member, a fourth rotating member, a third connecting member, a fourth connecting member, a connecting seat, a toggle member and a pressing member, the buoyancy member is movably arranged in the measurement box, one end of the fourth rotating member is connected with the buoyancy members, the other end of the fourth rotating member is movably connected with an inner wall of the measurement box, two ends of the third connecting member are movably connected with the fourth rotating members and the fourth connecting members respectively, the fourth connecting member is fixed on a side wall of the connecting seats, the connecting seat is movably arranged in the measurement box, the toggle member and the pressing member are arranged on the connecting seat, and one end of the pressing member are attached to side walls of the toggle members;

One end of the toggle member is connected with rotating grooves formed in the rotating seat; the rotating seat is fixedly sleeved on the rotating shaft; one end of the rotating shaft is movably connected with the inner wall of the measurement box; the other end of the rotating shaft is fixedly connected with the second screw rod; the second screw rod is in threaded connection with the control seat; the control seat are movably arranged in the water inlet pipe; one end of the control seat is movably connected with the water retaining member; the rotary assembly is sleeved on the rotating shaft; and one end of the rotary assembly are connected with the rotating seat.

According to a quantity of measurement data and depths of water bodies, the measurement boxes equipped with different elastic members are connected with each other through the connection mechanisms, and the counterweight box is connected to the bottom of the measurement box through the connection mechanism.

If pressures of water bodies are larger than the elastic force of the elastic members, the pressures of the water bodies drive the water retaining members to rotate, the water retaining members make external water enter the measurement boxes through water inlets by rotating; the temperature measurement instruments measure temperatures of the water in the measurement boxes and transmit measurement information to a data center; the control mechanisms extract water at different water body depths by arranging elastic members with different degrees of elastic force; and the temperature measurement instrument measures the temperatures of the water at different water body depths in time by cooperating with the control mechanisms and the measurement boxes.

the water in the measurement boxes drives the buoyancy members to move upward, the buoyancy members drive the fourth rotating members to rotate, the fourth rotating members drive the third connecting members to move upward, the third connecting members drive the connecting seats to rotate by virtue of the fourth connecting members, the connecting seats drive the toggle members and the pressing members to rotate, the toggle members drive the rotating seats to rotate by cooperating with the rotating grooves, the rotating seats drive the rotating shafts to rotate, the rotating shafts drive the second screw rods and the rotary assemblies to rotate, the second screw rods drive the control seats to move, the control seats drive the water retaining members to rotate in a moving manner, and the water retaining members close the water inlet pipes in a rotating manner.

As a further technical solution of the present invention, each rotary assembly includes a power accumulation member, a connecting sleeve and a fixed member; two ends of the power accumulation member are connected with the connecting sleeve and the fixed member respectively; the connecting sleeve are fixedly sleeved on the rotating shaft; and the fixed members are eccentrically arranged on the rotating seat.

As a further technical solution of the present invention, each connection mechanism includes fixed seats, mounting members, a limiting seat, a rotary handle and a clamping assembly; the fixed seats are arranged symmetrically at two ends of the measurement box; one mounting member is fixedly mounted at bottom of the measurement box; the limiting seat is fixedly arranged on the fixed seat on one side; the clamping assemblies are arranged on the fixed seat on the other side; the limiting seat and the clamping assembly are movably connected with the inner walls of the mounting members; and the rotary handle are movably connected with one end of the clamping assembly.

As a further technical solution of the present invention, each clamping assembly includes a third rotating member, a first screw rod, an adjusting seat, connecting rod modules and clamping seats; one end of the third rotating member penetrates through the fixed seats and are movably connected with the rotary handle; one end of the third rotating member extends into the adjusting seat and is in threaded connection with the first screw rod; the first screw rod is arranged in the adjusting seat; two ends of the connecting rod modules are connected with the adjusting seat and the clamping seats respectively; one end of the clamping seats is movably arranged on the fixed seats; and the clamping seats are connected with the inner walls of the mounting members.

As a further technical solution of the present invention, the pushing mechanism includes a mounting box, a reciprocating assembly, a moving seat, a mounting seat, a swing assembly and paddles; the mounting box is fixed in the counterweight box; the reciprocating assembly, the mounting seat and the swing assembly are all arranged in the mounting box; an output end of the reciprocating assembly is connected with the moving seat; the moving seat is movably arranged in the mounting seat; the moving seat is connected with the swing assembly; and one end of the swing assembly extends out of the mounting box and is connected to the paddles.

As a further technical solution of the present invention, the reciprocating assembly includes a driving member, a first rotating member, a first connecting member and a second connecting member; the driving member is fixed in the mounting box; an output end of the driving member is connected with one end of the first rotating member; the other end of the first rotating member is connected with the first connecting member; and two ends of the second connecting member are connected with the first connecting member and the moving seat respectively.

As a further technical solution of the present invention, the swing assembly includes connecting rods, second rotating members, rotating sleeves, a fixed shaft, mounting sleeves and swing members; one ends of the connecting rods are connected with the moving seat, and the other ends of the connecting rods are eccentrically connected with the second rotating members; the second rotating members are fixedly sleeved on the rotating sleeves; the rotating sleeves are movably sleeved on the fixed shaft; the fixed shaft is fixed in the mounting box; the mounting sleeves are fixedly sleeved on the rotating sleeves; one ends of the swing members are fixedly connected with outer walls of the mounting sleeves; and the other ends of the swing members extend out of the mounting box and are connected with the paddles.

Compared with the prior art, the present invention has the beneficial effects as follows:

According to a quantity of measurement data and depths of water bodies, the measurement boxes equipped with different elastic members are connected with each other through the connection mechanisms, and the counterweight box is connected to the bottom measurement box through the connection mechanism.

If the pressures of the water bodies are larger than the elastic force of the elastic members, the pressures of the water bodies drive the water retaining members to rotate, the water retaining members make the external water enter the measurement boxes through the water inlets by rotating; and the temperature measurement instruments measure the temperatures of the water in the measurement boxes and transmit the measurement information to the data center.

Due to different depths of the water bodies, the pressures of the water bodies are also different. The control mechanisms extract water at different water body depths by arranging elastic members with different degrees of elastic force; and the temperature measurement instruments measure the temperatures of the water at different water body depths in time by cooperating with the control mechanisms and the measurement boxes. Therefore, the accuracy and the comprehensiveness of the measurement data about the water environment temperature are ensured, and protection of the water environment is further improved.

After being accumulated in the measurement boxes with a certain amount, the water in the measurement boxes drives the buoyancy members to move upward; the buoyancy members drive the fourth rotating members to rotate; the fourth rotating members drive the third connecting members to move upward; the third connecting members drive the connecting seats to rotate by virtue of the fourth connecting members; the connecting seats drive the toggle members and the pressing members to rotate; the toggle members drive the rotating seats to rotate by cooperating with the rotating grooves; the rotating seats drive the rotating shafts to rotate; the rotating shafts drive the second screw rods and the rotary assemblies to rotate; the second screw rods drive the control seats to move; the control seats drive the water retaining members to rotate in the moving manner; and the water retaining members close the water inlet pipes in the rotating manner.

After the measurement boxes leave the water bodies and the switching valves at the bottoms are opened, the water in the measurement boxes flows out. At this time, the buoyancy members move downward, and drive the fourth rotating members to rotate; the fourth rotating members drive the third connecting members to move back; the third connecting members drive the connecting seats to rotate by virtue of the fourth connecting members; and the connecting seats drive the toggle members and the pressing members to rotate, to make the toggle members separated from the rotating grooves formed in the rotating seats. At this time, the power accumulation members drive the rotating seats to rotate by virtue of their own elastic force; and the rotating seats drive the rotating shafts to rotate, to make the control seats move back and be separated from the water retaining members. At this time, under the action of the elastic force of the elastic members, the water retaining members are always in a closed state, which is convenient for the measurement boxes to extract and measure the water in the water environment again, thereby improving the work efficiency and the practicality of the tool.

In order to more clearly illustrate the structural features and functions of the present invention, the present invention will be described in detail below in conjunction with the accompanying drawings and specific embodiments.

Figure 1:
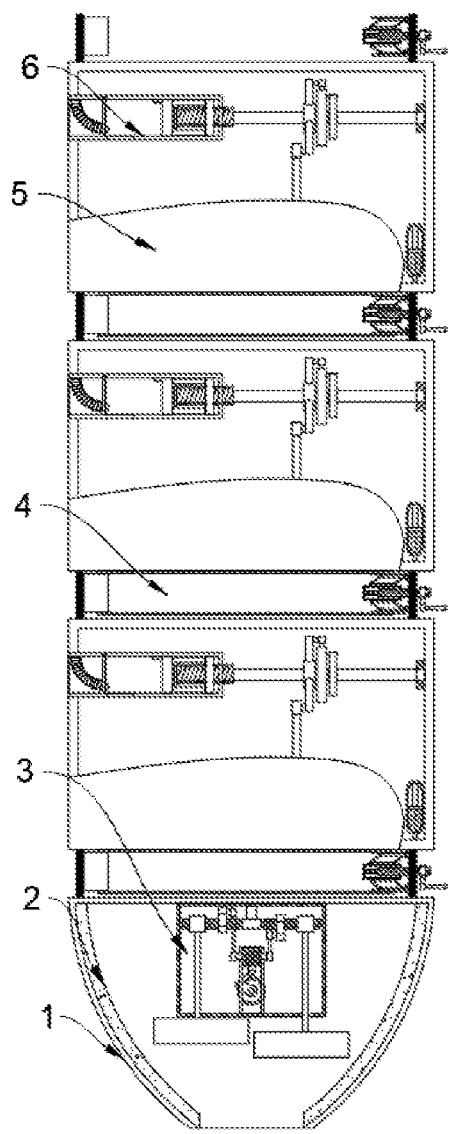
FIG. 1 is a schematic structural diagram of a water environment temperature measurement tool provided by an embodiment of the present invention.

Reference numerals: 1—counterweight box, 2—counterweight block, 3—pushing mechanism, 31—mounting box, 32—reciprocating assembly, 321—driving member, 322—first rotating member, 323—first connecting member, 324—second connecting member, 33—moving seat, 34—mounting seat, 35—swing assembly, 351—connecting rod, 352—second rotating member, 353—rotating sleeve, 354—fixed shaft, 356—mounting sleeve, 357—swing member, 36—paddle, 4—connection mechanism, 41—fixed seat, 42—mounting member, 43—limiting seat, 44—rotary handle, 45—clamping assembly, 451—third rotating member, 452—first screw rod, 453—adjusting seat, 454—connecting rod module, 455—clamping seat, 5—measurement box, 6—control mechanism, 61—water inlet pipe, 611—water inlet, 62—water retaining member, 63—elastic member, 64—control assembly, 641—buoyancy member, 6411—fourth rotating member, 642—third connecting member, 643—fourth connecting member, 644—connecting seat, 645—toggle member, 646—pressing member, 65—rotating seat, 651—rotating groove, 66—rotating shaft, 67—second screw rod, 68—control seat, 69—rotary assembly, 691—power accumulation member, 692—connecting sleeve, 693—fixed member, and 7—temperature measurement instrument.

DETAILED DESCRIPTION

In order to make the objectives, technical solutions and advantages of the present invention clearer, the present invention will be further described in detail below in conjunction with the drawings and embodiments. It should be understood that the specific embodiments described herein are merely illustrative of the present invention and are not intended to limit the present invention.

The specific implementation of the present invention is described in detail below in conjunction with the particular embodiments.

As shown in FIGS. 1-8, as an embodiment of the present invention, a water environment temperature measurement tool includes measurement boxes 5 and a counterweight box 1, wherein a plurality of groups of measurement boxes 5 are provided, and are movably connected with each other; and the counterweight box 1 is movably connected with a group of measurement boxes 5; one end of the counterweight box 1 is arranged in an arc shape; the arc-shaped end of the counterweight box 1 is provided with an opening; a counterweight block 2 is fixedly arranged on an inner wall of the counterweight box 1; each measurement box 5 is provided with a temperature measurement instrument 7 inside; and a switching valve is arranged at a bottom of the measurement box 5. The water environment temperature measurement tool further includes:

a pushing mechanism 3, arranged in the counterweight box 1;

connection mechanisms 4, mounted on outer walls of the measurement boxes 5 and the counterweight box 1 separately, and configured to connect one measurement box 5 with another measurement box 5 and to connect the measurement boxes 5 with the counterweight box 1; and control mechanisms 6, each including a water inlet pipe 61, a water retaining member 62, an elastic member 63, a control assembly 64, a rotating seat 65, a rotating shaft 66, a second screw rod 67, a control seat 68 and a rotary assembly 69, where one end of the water inlet pipes 61 extends out of the measurement box 5, the other end of the water inlet pipe 61 is fixedly arranged in the measurement box 5, the water retaining member 62 and the elastic member 63 are movably arranged in the water inlet pipe 61, one end of the elastic member 63 is connected with the water retaining member 62, and own elastic force of the elastic members 63 arranged on different measurement boxes 5 are different.

Each control assembly 64 includes a buoyancy member 641, a fourth rotating member 6411, a third connecting member 642, a fourth connecting member 643, a connecting seat 644, a toggle member 645 and a pressing member 646; the buoyancy member 641 is movably arranged in the measurement boxes 5; one end of the fourth rotating members 6411 is connected with the buoyancy member 641; the other end of the fourth rotating member 6411 is movably connected with an inner wall of the measurement box 5; two ends of the third connecting member 642 are movably connected with the fourth rotating member 6411 and the fourth connecting members 643 respectively; the fourth connecting member 643 is fixed on a side wall of the connecting seat 644; the connecting seat 644 are movably arranged in the measurement box 5; the toggle member 645 and the pressing member 646 is arranged on the connecting seat 644; and one end of the pressing member 646 is attached to the side walls of the toggle member 645.

One end of the toggle member 645 is connected with rotating grooves 651 formed in the rotating seat 65; the rotating seat 65 is fixedly sleeved on the rotating shaft 66; one end of the rotating shaft 66 is movably connected with the inner wall of the measurement box 5; the other end of the rotating shaft 66 is fixedly connected with the second screw rod 67; the second screw rod 67 is in threaded connection with the control seat 68; the control seat 68 are movably arranged in the water inlet pipe 61; one end of the control seat 68 is movably connected with the water retaining member 62; the rotary assembly 69 is sleeved on the rotating shaft 66; and one end of the rotary assembly 69 is connected with the rotating seat 65.

According to a quantity of measurement data and depths of water bodies, the measurement boxes 5 equipped with different elastic members 6 are connected with each other through the connection mechanisms 4, and the counterweight box 1 is connected to the bottom measurement box 5 through the connection mechanism 4.

If pressures of water bodies are larger than the elastic force of the elastic members 63, the pressures of the water-bodies drive the water retaining members 62 to rotate, the water retaining members 62 make external water enter the measurement boxes 5 through water inlets 611 by rotating; the temperature measurement instruments 7 measure temperatures of the water in the measurement boxes 5 and transmit measurement information to a data center; the control mechanisms 6 extract water at different water body depths by arranging elastic members 63 with different degrees of elastic force; and the temperature measurement instruments 7 measure the temperatures of the water at different water depths in time by cooperating with the control mechanisms 6 and the measurement boxes 5.

The water in the measurement boxes 5 drives the buoyancy members 641 to move upward; the buoyancy members 641 drive the fourth rotating members 6411 to rotate; the fourth rotating members 6411 drive the third connecting members 642 to move upward; the third connecting members 642 drive the connecting seats 644 to rotate by virtue of the fourth connecting members 643; the connecting seats 644 drive the toggle members 645 and the pressing members 646 to rotate; the toggle members 645 drive the rotating seats 65 to rotate by cooperating with the rotating grooves 651; the rotating seats 65 drive the rotating shafts 66 to rotate; the rotating shafts 66 drive the second screw rods 67 and the rotary assemblies 69 to rotate; the second screw rods 67 drive the control seats 68 to move; the control seats 68 drive the water retaining members 62 to rotate in a moving manner; and the water retaining members 62 close the water inlet pipes 61 in a rotating manner.

In this embodiment, the control mechanisms 6 can achieve extraction and temperature measurement of the water at different water depths by cooperating with the measurement boxes 5 and the temperature measurement instruments 7, so as to improve the measurement efficiency of the tool to a water environment, and to ensure the accuracy and the comprehensiveness of the measurement data about the water environment temperature, and further improve protection of the water environment.

Figure 2:
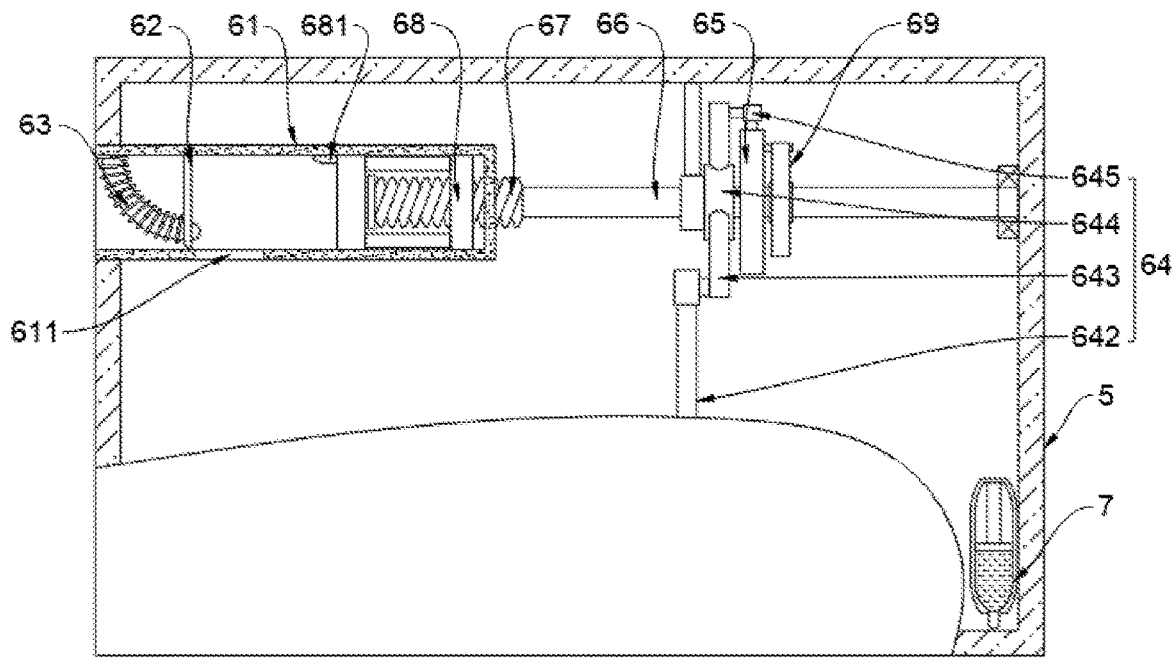
FIG. 2 is a schematic cross-sectional view of a structure of a measurement box in FIG. 1.
Figure 3:
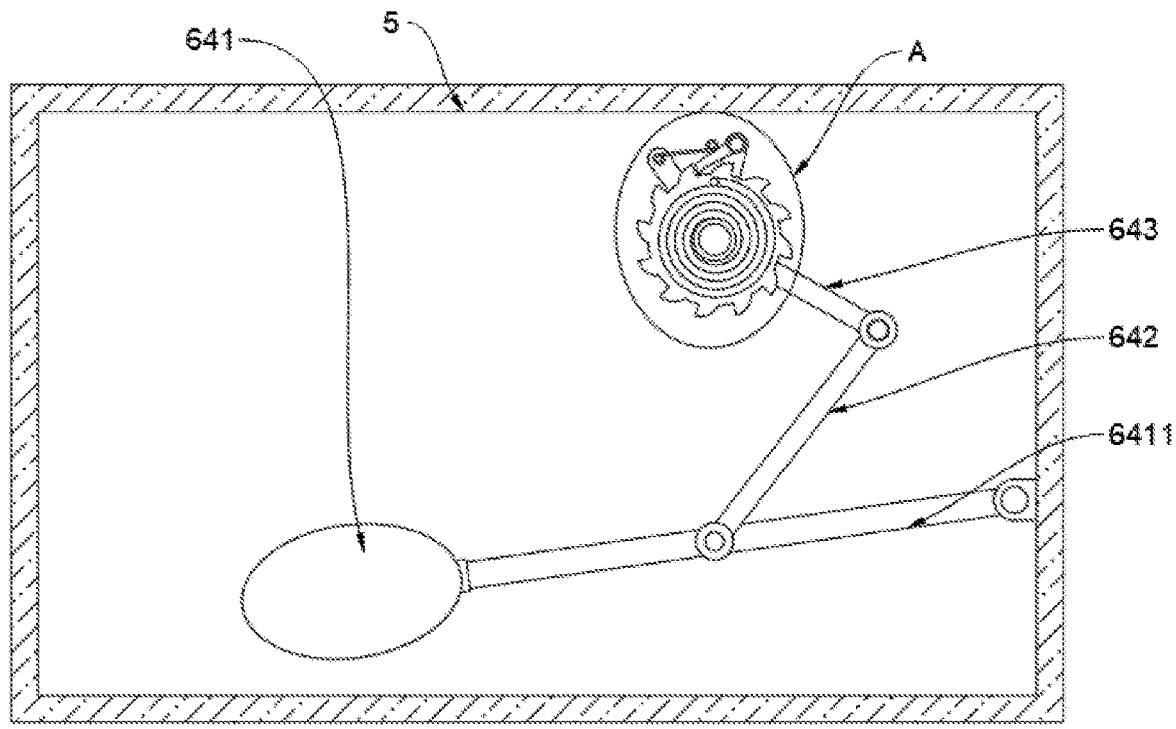
FIG. 3 is a cross-sectional side view of the structure of the measurement box in FIG. 2.
Figure 4:
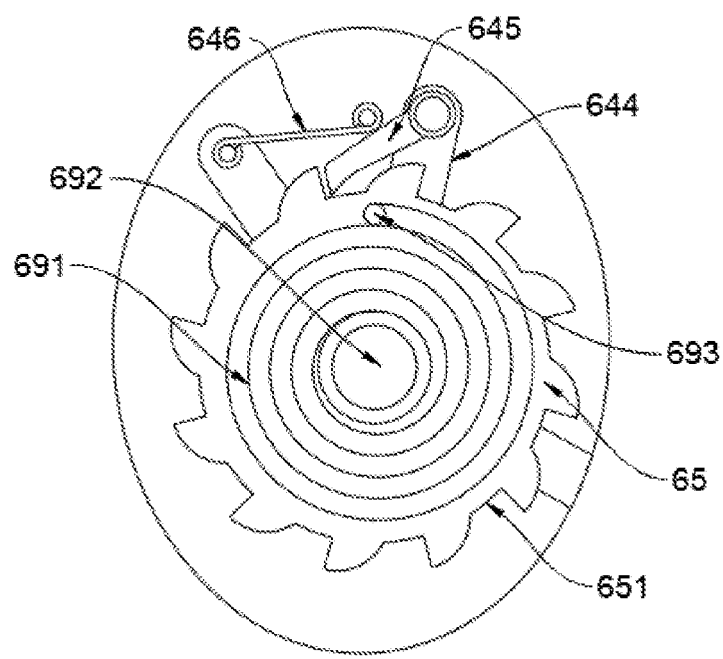
FIG. 4 is an enlarged view of a structure at A in FIG. 3.
Figure 5:
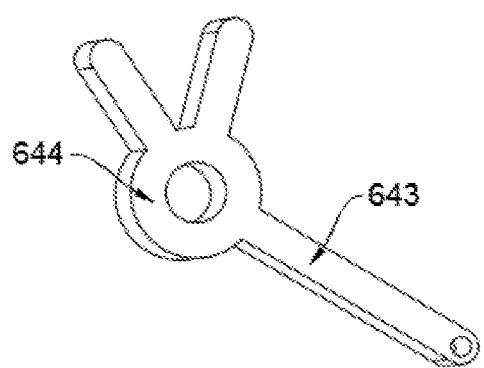
FIG. 5 is a structural perspective view of a fourth connecting member and a connecting seat in FIG. 4.

As shown in FIG. 2 and FIG. 4, as a preferred embodiment of the present invention, each rotary assembly 69 includes a power accumulation member 691, a connecting sleeve 692 and a fixed member 693; two ends of the power accumulation member 691 are connected with the connecting sleeves 692 and the fixed members 693 respectively; the connecting sleeve 692 is fixedly sleeved on the rotating shaft 66; and the fixed member 693 is eccentrically arranged on the rotating seat 65.

In this embodiment, after the measurement boxes 5 leave the water body and the switching valves at the bottoms are opened, the water in the measurement boxes 5 flows out. At this time, the buoyancy members 641 move downward, and drive the fourth rotating members 6411 to rotate; the fourth rotating members 6411 drive the third connecting members 642 to move back; the third connecting members 642 drive the connecting seats 644 to rotate by virtue of the fourth connecting members 643; and the connecting seats 644 drive the toggle members 645 and the pressing members 646 to rotate, to make the toggle members 645 separated from the rotating grooves 651 formed in the rotating seats 65. At this time, the power accumulation members 691 drive the rotating seats 65 to rotate by virtue of their own elastic force; and the rotating seats 65 drive the rotating shafts 66 to rotate, to make the control seats 68 move back and be separated from the water retaining members 62. At this time, under the action of the elastic force of the elastic members 63, the water retaining members 62 are always in a closed state, which is convenient for the measurement boxes 5 to extract and measure the water in the water environment again, thereby improving the work efficiency and the practicality of the tool.

In a preferred embodiment, the water retaining member 62 preferably adopts a platy structure, and sealing strip is arranged at contact positions between the water retaining member 62 and the inner wall of the water inlet pipe 61.

The elastic member 63 preferably adopts a spring.

The buoyancy member 641 preferably adopts a buoyancy ball with certain buoyancy.

The fourth rotating member 6411, the third connecting member 642 and the fourth connecting member 643 all preferably adopt a rod-shaped structure.

The toggle member 645 preferably adopts a blocky structure.

The pressing member 646 preferably adopts an elastic sheet.

The power accumulation member 691 preferably adopts a spiral elastic sheet.

The fixed member 693 are preferably of a columnar structure.

Figure 6:
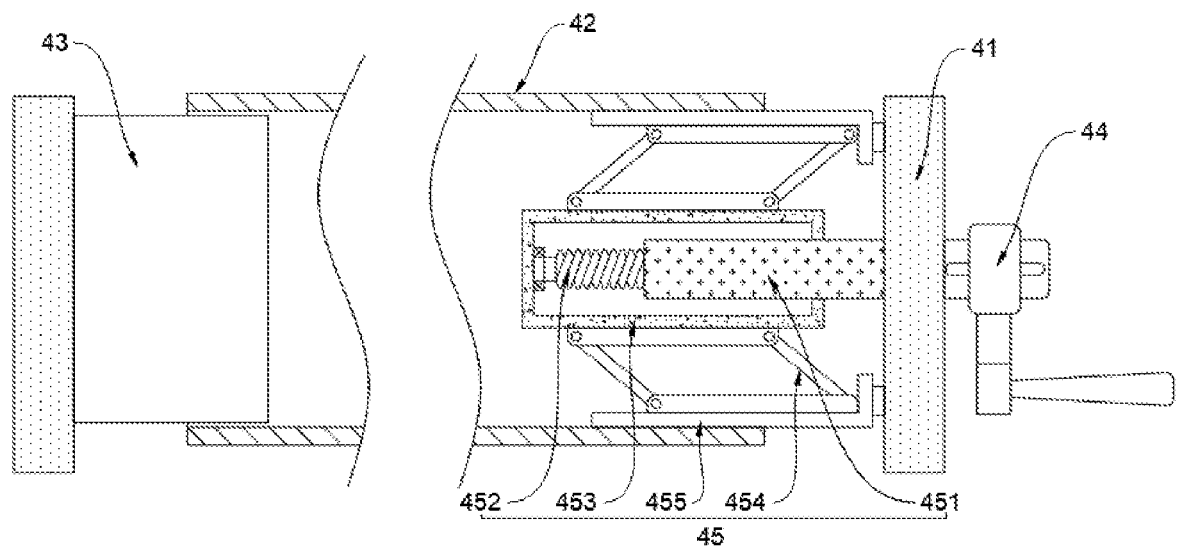
FIG. 6 is a structural cross-sectional view of a connection mechanism in FIG. 1.

As shown in FIG. 1 and FIG. 6, as a preferred embodiment of the present invention, each connection mechanism 4 includes fixed seats 41, mounting members 42, a limiting seat 43, a rotary handle 44 and a clamping assembly 45; the fixed seats 41 are arranged symmetrically at two ends of the measurement boxes 5; the mounting member 42 are fixedly mounted at bottom of the measurement box 5; the limiting seat 43 is fixedly arranged on the fixed seat 41 on one side; the clamping assembly 45 is arranged on the fixed seat 41 on the other side; the limiting seat 43 and the clamping assembly 45 are movably connected with the inner walls of the mounting member 42; and the rotary handle 44 is movably connected with one end of the clamping assembly 45.

As shown in FIG. 1 and FIG. 6, as a preferred embodiment of the present invention, each clamping assembly 45 includes a third rotating member 451, a first screw rod 452, an adjusting seat 453, connecting rod modules 454 and clamping seats 455; one end of the third rotating member 451 penetrates through the fixed seats 41 and is movably connected with the rotary handle 44; one end of the third rotating member 451 extends into the adjusting seat 453 and is in threaded connection with the first screw rod 452; the first screw rod 452 is arranged in the adjusting seat 453; two ends of the connecting rod modules 454 are connected with the adjusting seat 453 and the clamping seats 455 respectively; one end of the clamping seats 455 are movably arranged on the fixed seats 41; and the clamping seats 455 are connected with the inner walls of the mounting members 42.

In this embodiment, if it is necessary to connect one measurement box 5 with another measurement box 5 or connect the measurement boxes 5 with the counterweight box 1, one end of the mounting members 42 are first sleeved on the clamping assembly 45, and then the other end of the mounting members 42 move back to the limiting seat 43; the rotary handle 44 is detachable handle 44 and drives the third rotating member 451 to rotate; the third rotating member 451 drives the adjusting seat 453 to move through the first screw rod 452; the adjusting seat 453 drives a plurality of groups of clamping seats 455 to move through the connecting rod module 454; and the clamping seats 455 clamp the mounting members 42 in the moving manner, thereby connecting one measurement box 5 with another measurement box 5 or connecting the measurement boxes 5 with the counterweight box 1. Therefore, a worker equips the measurement boxes 5 that meet the requirements according to the quantity of the measurement data and the depths of the water bodies, so as to ensure the accuracy and the comprehensiveness of the data about the water body temperature in the water environment, and improve the work efficiency and the practicability of the tool.

In a preferred embodiment, the mounting members 42 preferably adopt a cylindrical structure.

The third rotating member 451 preferably adopts a cylindrical structure.

The connecting rod modules 454 preferably adopt a diamond-shaped structure composed of connecting rods.

Figure 7:
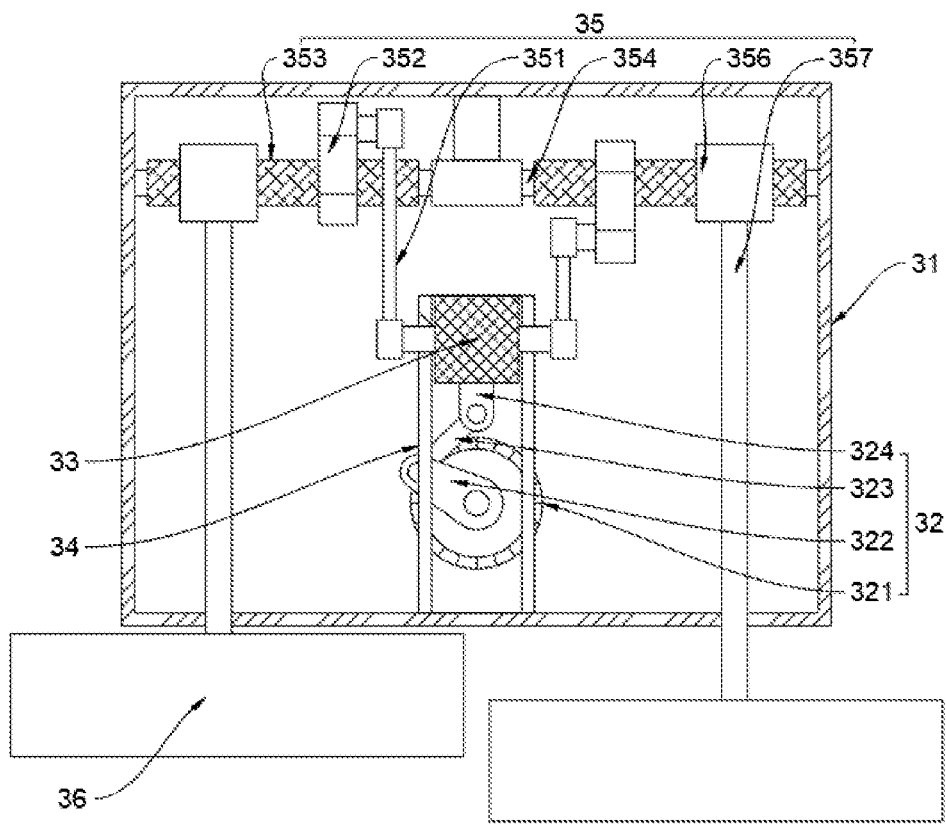
FIG. 7 is a structural cross-sectional view of a pushing mechanism in FIG. 1.
Figure 8:
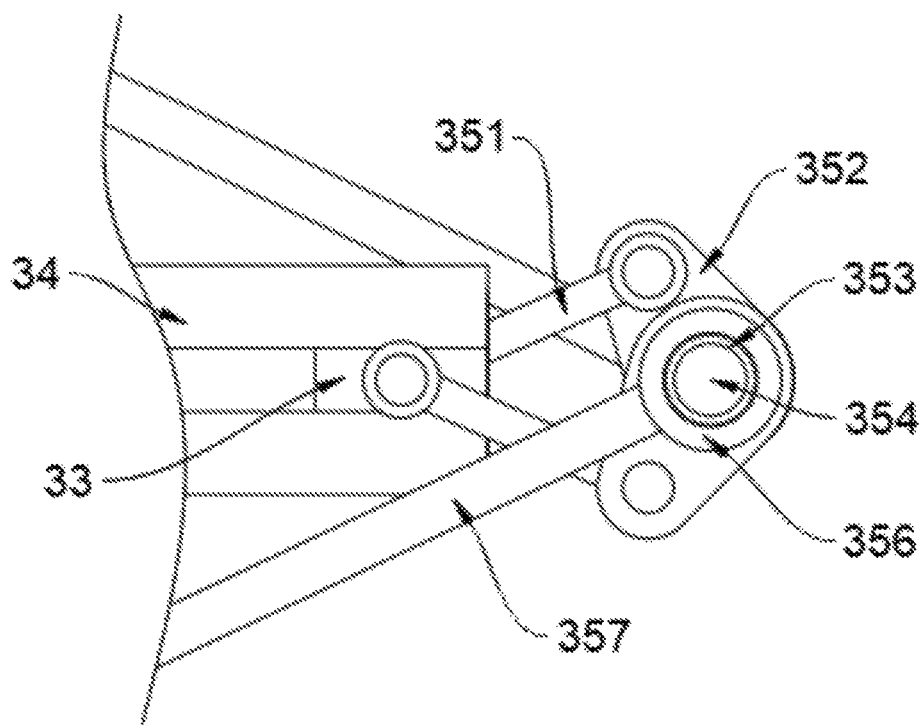
FIG. 8 is a side view of a partial structure of the pushing mechanism in FIG. 7.

As shown in FIG. 7 and FIG. 8, as a preferred embodiment of the present invention, the pushing mechanism 3 includes a mounting box 31, a reciprocating assembly 32, a moving seat 33, a mounting seat 34, a swing assembly 35 and paddles 36; the mounting box 31 is fixed in the counterweight box 1; the reciprocating assembly 32, the mounting seat 34 and the swing assembly 35 are all arranged in the mounting box 31; an output end of the reciprocating assembly 32 is connected with the moving seat 33; the moving seat 33 is movably arranged in the mounting seat 34; the moving seat 33 is connected with the swing assembly 35; and one end of the swing assembly 35 extends out of the mounting box 31 and is connected to the paddles 36.

As shown in FIG. 7 and FIG. 8, as a preferred embodiment of the present invention, the reciprocating assembly 32 includes a driving member 321, a first rotating member 322, a first connecting member 323 and a second connecting member 324; the driving member 321 is fixed in the mounting box 31; an output end of the driving member 321 is connected with one end of the first rotating member 322; the other end of the first rotating member 322 is connected with the first connecting member 323; and two ends of the second connecting member 324 are connected with the first connecting member 323 and the moving seat 33 respectively.

As shown in FIG. 7 and FIG. 8, as a preferred embodiment of the present invention, the swing assembly 35 includes connecting rods 351, second rotating members 352, rotating sleeves 353, a fixed shaft 354, mounting sleeves 356 and swing members 357; one ends of the connecting rods 351 are connected with the moving seat 33, and the other ends of the connecting rods 351 are eccentrically connected with the second rotating members 352; the second rotating members 352 are fixedly sleeved on the rotating sleeves 353; the rotating sleeves 353 are movably sleeved on the fixed shaft 354; the fixed shaft 354 is fixed in the mounting box 31; the mounting sleeves 356 are fixedly sleeved on the rotating sleeves 353; one ends of the swing members 357 are fixedly connected with outer walls of the mounting sleeves 356; and the other ends of the swing members 357 extend out of the mounting box 31 and are connected with the paddles 36.

In this embodiment, after the measurement boxes 5 extract the water and detect the temperatures of the water in the water bodies, the driving member 321 drives the first rotating member 322 to rotate; the first rotating member 322 drives the moving seat 33 to make reciprocating motion through the first connecting member 323 and the second connecting member 324; the moving seat 33 drives two groups of second rotating members 352 to make reciprocating rotation through the connecting rods 351; the two groups of second rotating members 352 are alternately arranged on the rotating sleeves 353, and drive the two groups of rotating sleeves 353 rotate reversely; and the two groups of rotating sleeves 353 drive two groups of mounting sleeves 356 to rotate reversely; the two groups of mounting sleeves 356 drive two groups of paddles 36 to alternately rotate through the swing members 357; and the two groups of paddles 36 generate push force in an alternate rotating manner, and then the tool is pushed to the water surface. Therefore, the worker is convenient to recycle the tool, and reuse of the tool is facilitated, so that the work efficiency and the practicability of the tool are improved.

In a preferred embodiment, the driving member 321 preferably adopts a servo motor.

Both the first rotating member 322 and the second rotating members 352 preferably adopt a cam structure.

The first connecting member 323, the second connecting member 324 and the swing members 357 preferably adopt the rod-shaped structure.

The present invention uses the following working principle:

According to the quantity of the measurement data and the depths of the water bodies, the measurement boxes 5 equipped with different elastic members 63 are connected with each other through the connection mechanisms 4, and the counterweight box 1 is connected to the bottom measurement box 5 through the connection mechanism 4. If it is necessary to connect one measurement box 5 with another measurement box 5 or connect the measurement boxes 5 with the counterweight box 1, one ends of the mounting members 42 are first sleeved on the clamping assemblies 45, and then the other ends of the mounting members 42 move back to the limiting seats 43; the rotary handles 44 are detachable handles 44 and drive the third rotating members 451 to rotate; the third rotating members 451 drive the adjusting seats 453 to move through the first screw rods 452; the adjusting seats 453 drive a plurality of groups of clamping seats 455 to move through the connecting rod modules 54; and the clamping seats 455 clamp the mounting members 42 in the moving manner, thereby connecting one measurement box 5 with another measurement box 5 or connecting the measurement boxes 5 with the counterweight box 1. Therefore, the worker equips the measurement boxes 5 that meet the requirements according to the quantity of the measurement data and the depths of the water bodies.

The counterweight box 1 and the measurement boxes 5 dive to the bottoms of the water bodies by a dead weight of the counterweight block 2. If the pressures of the water bodies are larger than the elastic force of the elastic members 63, the pressures of the water pressure drive the water retaining members 62 to rotate, the water retaining members 62 make the external water enter the measurement boxes 5 through the water inlets 611 by rotating; the temperature measurement instruments 7 measure the temperatures of the water in the measurement boxes 5 and transmit the measurement information to the data center.

Due to different depths of the water bodies, the pressures of the water bodies are also different. The control mechanisms 6 extract the water at different water body depths by arranging the elastic members 63 with different degrees of elastic force; and the temperature measurement instruments 7 measure the temperatures of the water at different water body depths in time by cooperating with the control mechanisms 6 and the measurement boxes 5.

After being accumulated in the measurement boxes 5 with a certain amount, the water in the measurement boxes 5 drives the buoyancy members 641 to move upward; the buoyancy members 641 drive the fourth rotating members 6411 to rotate; the fourth rotating members 6411 drive the third connecting members 642 to move upward; the third connecting members 642 drive the connecting seats 644 to rotate by virtue of the fourth connecting members 643; the connecting seats 644 drive the toggle members 645 and the pressing members 646 to rotate; the toggle members 645 drive the rotating seats 65 to rotate by cooperating with the rotating grooves 651; the rotating seats 65 drive the rotating shafts 66 to rotate; the rotating shafts 66 drive the second screw rods 67 and the rotary assemblies 69 to rotate; the second screw rods 67 drive the control seats 68 to move; the control seats 68 drive the water retaining members 62 to rotate in the moving manner; and the water retaining members 62 close the water inlet pipes 61 in the rotating manner.

After the measurement boxes 5 extract the water and detect the temperatures of the water in the water bodies, the driving member 321 drives the first rotating member 322 to rotate; the first rotating member 322 drives the moving seat 33 to make reciprocating motion through the first connecting member 323 and the second connecting member 324; the moving seat 33 drives two groups of second rotating members 352 to make reciprocating rotation through the connecting rods 351; the two groups of second rotating members 352 are alternately arranged on the rotating sleeves 353, and drive the two groups of rotating sleeves 353 rotate reversely; and the two groups of rotating sleeves 353 drive two groups of mounting sleeves 356 to rotate reversely; the two groups of mounting sleeves 356 drive two groups of paddles 36 to alternately rotate through the swing members 357; and the two groups of paddles 36 generate the push force in the alternate rotating manner, and then the tool is pushed to the water surface. Therefore, the worker is convenient to recycle the tool, and reuse of the tool is facilitated.

After the measurement boxes 5 leave the water bodies and the switching valves at the bottoms are opened, the water in the measurement boxes 5 flows out. At this time, the buoyancy members 641 move downward, and drive the fourth rotating members 6411 to rotate; the fourth rotating members 6411 drive the third connecting members 642 to move back; the third connecting members 642 drive the connecting seats 644 to rotate by virtue of the fourth connecting members 643; and the connecting seats 644 drive the toggle members 645 and the pressing members 646 to rotate, to make the toggle members 645 separated from the rotating grooves 651 formed in the rotating seats 65. At this time, the power accumulation members 691 drive the rotating seats 65 to rotate by virtue of their own elastic force; and the rotating seats 65 drive the rotating shafts 66 to rotate, to make the control seats 68 move back and be separated from the water retaining members 62. At this time, under the action of the elastic force of the elastic members 63, the water retaining members 62 are always in the closed state, which is convenient for the measurement boxes 5 to extract and measure the water in the water environment again.

The above is the working principle of the water environment temperature measurement tool.

The above descriptions are only preferred embodiments of the present invention, and are not intended to limit the present invention. Any modifications, equivalent replacements, improvements, etc. made within the spirit and the principle of the present invention should all fall within the scope of protection of the present invention.

The invention claimed is:

1. A water environment temperature measurement tool, comprising measurement boxes and a counterweight box, wherein the measurement boxes are provided to be more than one, and are movably connected together; and the counterweight box is movably connected with one of the measurement boxes; one end of the counterweight box is arranged in an arc shape; the arc-shaped end of the counterweight box is provided with an opening; a counterweight block is fixedly arranged on an inner wall of the counterweight box; each of the measurement boxes is provided with a temperature measurement instrument inside; and a switching valve is arranged at a bottom portion of each of the measurement boxes; and the water environment temperature measurement tool further comprising:

a pushing mechanism, arranged in the counterweight box;
connection mechanisms, mounted on outer walls of the measurement boxes and the counterweight box separately, and configured to connect the measurement boxes and to connect the measurement boxes with the counterweight box; and
control mechanisms, each comprising a water inlet pipe, a water retaining member, an elastic member, a control assembly, a rotating seat, a rotating shaft, a second screw rod, a control seat and a rotary assembly, wherein one end of the water inlet pipe extends out of one of the measurement boxes, another end of the water inlet pipe is fixedly arranged in one of the measurement boxes, the water retaining member and the elastic member are movably arranged in the water inlet pipe, one end of the elastic member is connected with the water retaining member, and each elastic force of the elastic members on the different measurement boxes are different;
each control assembly comprises a buoyancy member, a fourth rotating member, a third connecting member, a fourth connecting member, a connecting seat, a toggle member and a pressing member, the buoyancy member is movably arranged in one of the measurement boxes, one end of the fourth rotating member is connected with the buoyancy members, another end of the fourth rotating member is movably connected with an inner wall of one of the measurement boxes, two ends of the third connecting member are movably connected with the fourth rotating member and the fourth connecting member respectively, the fourth connecting member is fixed on a side wall of the connecting seat, the connecting seat is movably arranged in one of the measurement boxes, the toggle members and the pressing members are arranged on the connecting seat, and one end of the pressing members is attached to a side wall of the toggle members;

one end of the toggle member is connected with a rotating groove formed in the rotating seat, the rotating seat is fixedly sleeved on the rotating shaft, one end of the rotating shaft is movably connected with an inner wall of one of the measurement boxes, another end of the rotating shafts is fixedly connected with the second screw rod, the second screw rod is in threaded connection with the control seat, the control seat is movably arranged in the water inlet pipe, one end of the control seat is movably connected with the water retaining member, the rotary assembly is sleeved on the rotating shaft, and one end of the rotary assembly is connected with the rotating seat;

wherein the tool is configured such that if pressures of water bodies are larger than the elastic force of the elastic members, the pressures of the water bodies drive the water retaining members to rotate, the water retaining members make external water enter the measurement boxes through water inlets by rotating; the temperature measurement instruments measure temperatures of the water in the measurement boxes and transmit measurement information to a data center; the control mechanisms extract water at different water body depths by arranging elastic members with different degrees of elastic force; and the temperature measurement instruments measure the temperatures of the water at different water body depths in time by cooperating with the control mechanisms and the measurement boxes; and the water in the measurement boxes drives the buoyancy members to move upward, the buoyancy member drives the fourth rotating member to rotate, the fourth rotating member drives the third connecting member to move upward, the third connecting member drives the connecting seat to rotate by virtue of the fourth connecting member, the connecting seat drives the toggle member and the pressing member to rotate, the toggle member drives the rotating seat to rotate by cooperating with the rotating groove, the rotating seat drives the rotating shaft to rotate, the rotating shaft drives the second screw rod and the rotary assembly to rotate, the second screw rod drives the control seat to move, the control seat drives the water retaining member to rotate, and the water retaining member closes the water inlet pipe by rotating.

2. The water environment temperature measurement tool according to claim 1, wherein each rotary assembly comprises a power accumulation member, a connecting sleeve and a fixed member; two ends of the power accumulation members are connected with the connecting sleeve and the fixed member respectively; the connecting sleeve is fixedly sleeved on the rotating shaft; and the fixed member is eccentrically arranged on the rotating seat.

3. The water environment temperature measurement tool according to claim 1, wherein each connection mechanism comprises fixed seats, mounting members, a limiting seat, a rotary handle and a clamping assembly; the fixed seats are arranged symmetrically at two ends of one of the measurement boxes; one of the mounting members is fixedly mounted at a bottom portion of one of the measurement boxes; the limiting seat is fixedly arranged on the fixed seat on one side; the clamping assembly is arranged on one of the fixed seats on the other side; the limiting seat and the clamping assembly are movably connected with inner walls of the mounting members; and the rotary handle is movably connected with one end of the clamping assembly.

4. The water environment temperature measurement tool according to claim 3, wherein each clamping assembly comprises a third rotating member, a first screw rod, an adjusting seat, connecting rod modules and clamping seats; one end of the third rotating member penetrates through the fixed seats and is movably connected with the rotary handle; one end of the third rotating member extends into the adjusting seat and is in threaded connection with the first screw rod; the first screw rod is arranged in the adjusting seat; two ends of the connecting rod modules are connected with the adjusting seat and the clamping seats respectively; one end of the clamping seats are movably arranged on the fixed seats; and the clamping seats are connected with the inner walls of the mounting members.

5. The water environment temperature measurement tool according to claim 1, wherein the pushing mechanism comprises a mounting box, a reciprocating assembly, a moving seat, a mounting seat, a swing assembly and paddles; the mounting box is fixed in the counterweight box; the reciprocating assembly, the mounting seat and the swing assembly are all arranged in the mounting box; an output end of the reciprocating assembly is connected with the moving seat; the moving seat is movably arranged in the mounting seat; the moving seat is connected with the swing assembly; and one end of the swing assembly extends out of the mounting box and is connected to the paddles.

6. The water environment temperature measurement tool according to claim 5, wherein the reciprocating assembly comprises a driving member, a first rotating member, a first connecting member and a second connecting member; the driving member is fixed in the mounting box; an output end of the driving member is connected with one end of the first rotating member; another end of the first rotating member is connected with the first connecting member; and two ends of the second connecting member are connected with the first connecting member and the moving seat respectively.

7. The water environment temperature measurement tool according to claim 5, wherein the swing assembly comprises connecting rods, second rotating members, rotating sleeves, a fixed shaft, mounting sleeves and swing members; either ends of the connecting rods are connected with the moving seat, and the other ends of the connecting rods are eccentrically connected with the second rotating members; the second rotating members are fixedly sleeved on the rotating sleeves; the rotating sleeves are movably sleeved on the fixed shaft; the fixed shaft is fixed in the mounting box; the mounting sleeves are fixedly sleeved on the rotating sleeves; either ends of the swing members are fixedly connected with outer walls of the mounting sleeves; and the other ends of the swing members extend out of the mounting box and are connected with the paddles.

* * * * *